Nov. 20, 1945.　　　A. J. WINCHESTER, JR　　　2,389,396

TIME DELAY CIRCUIT

Filed May 28, 1943

WITNESSES:　　　　　　　　　　　　　　　　　　　　　INVENTOR
　　　　　　　　　　　　　　　　　　　　　　　　　Amos J. Winchester, Jr.
　　　　　　　　　　　　　　　　　　　　　　　　BY
　　　　　　　　　　　　　　　　　　　　　　　Paul E. Friedemann
　　　　　　　　　　　　　　　　　　　　　　　　　ATTORNEY Patented Nov. 20, 1945

2,389,396

UNITED STATES PATENT OFFICE 2,389,396

TIME DELAY CIRCUITS

Amos J. Winchester, Jr., Swissvale, Pa., assignor to Westinghouse Electric Corporation, East Pittsburgh, Pa., a corporation of Pennsylvania Application May 28, 1943, Serial No. 488,937

9 Claims. (Cl. 175—294)

My invention relates to improvements in electric control systems and more particularly to time limit means for controlling electromagnetic or other similar devices.

Time limit devices utilizing the discharge of a condenser, or capacitor, to hold an electromagnetic device in an energized position for a short time are known.

One broad object of my invention is an improvement in the combination of a capacitor and electromagnetic device to obtain a time delay in the operation of the electromagnetic device.

Another object of my invention is the provision of time delay circuit means, including a capacitor and an electromagnetic device, for obtaining a longer time constant, for a given size capacitor and electromagnetic device, than has been possible to obtain heretofore.

A further object of my invention is the provision of time delay means that are cheap, efficient, and easily manufactured and used.

The objects expressly stated are merely illustrative. Many other objects and advantages will become more apparent from a study of the specification and the drawing accompanying my specification, in which drawing.

Figure 1:
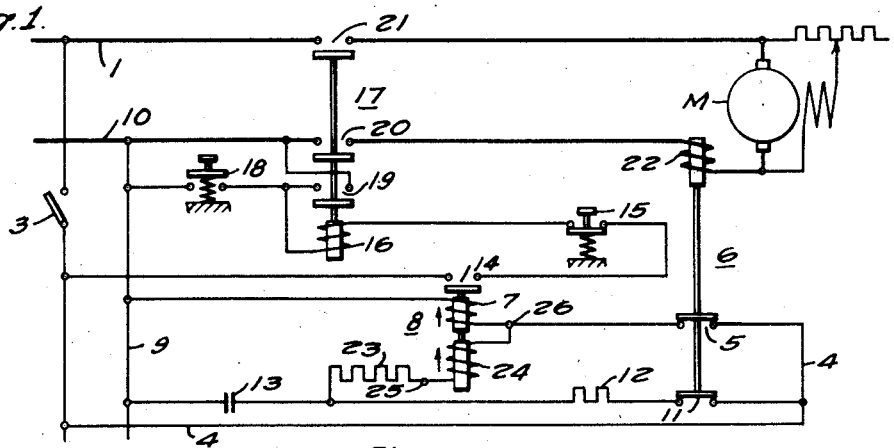
Figure 1 is a diagrammatic showing of my invention in combination with an overload protective motor control.

In Figure 1, M designates a motor, 17 the main line contactor, and 6 an overload protective device which may be of any known type, such as shown or a thermostatically operated device. The devices just mentioned, taken alone, are all old in the art. The novel features of my invention are embodied primarily in the elements of the relay 8, the resistors 12 and 23 and the capacitor 13.

The time of release of an armature coacting with a solenoid may be delayed by utilizing the discharge current of a capacitor to keep the solenoid coil energized after the voltage supply circuit for the solenoid coil is broken. The length of the time delay for the drop-out of the solenoid armature may be increased by inserting a resistor in series with the solenoid coil and the capacitor during discharge of the capacitor. The resistor decreases the rate of flow of energy from the capacitor and thus lengthens the time the armature remains picked up after the energy supply to the coil is removed.

The discussion of the prior art scheme of the preceding paragraph can be visualized even from my showing. Assume that junction 25 is connected to junction 26 (Fig. 1), that coil 24 is not used, and that coil 7, the only coil on relay 8, is energized from energized conductors 4 and 9 through switch 5. This means when switch 5 is closed, the resistor 23 and the capacitor 13 are connected in parallel to coil 7 and the capacitor becomes charged, and when switch 5 is opened there is a series circuit including capacitor 13, resistor 23, junctions 25 and 26, coil 7, conductor 9 back to capacitor 13.

To get the longest time possible out of a relay, the capacitor size chosen may be high but since capacitors are expensive and since the amount of energy that can be stored in a capacitor is limited the practice was to use a coil of as many turns as possible. The more turns on a coil, the greater are the resultant ampere turns per ampere, and the relay will thus hold in by means of a smaller capacitor. The number of turns which can be used, however, is limited. It takes many more ampere turns to pick up a relay armature than it takes to hold the armature in. The number of turns is, of course, limited by physical space. As the wire size is reduced and the number of turns is increased, the initial ampere turns, with a constant impressed voltage, are limited because of the increased portion of the available useful space that is taken up by insulation. As the minimum ampere turns for armature pick-up of the relay is approached, the relay closes sluggishly, and for slight drops in voltage fails to close.

Figure 3:
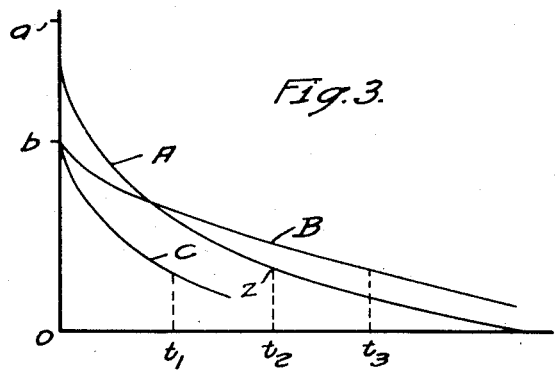
Fig. 3 shows curves illustrating the improvements and novel results I obtained with my invention.

Curve A in Fig. 3 shows the best kind of hold-in force variation with reference to time that can be obtained with prior art schemes when a capacitor larger than commercially warranted is chosen. It will be noted from this curve A that the holding force decreases from point $a$ to point $z$, the drop-out value of the relay. The magnitude of the time constant obtained is thus represented by $t_2$.

With my scheme I provide a comparatively heavy coil 7, that is, this coil may be of relatively thick wire thus requiring a relatively low number of turns and thus not taking up much space for insulation and conducting metal, as copper. With this kind of coil the pick-up of the relay armature is "snappy," a very desirable characteristic. The relatively large remaining available useful space on the relay for the coil structure I fill with a coil 24 designed to have as many turns as possible without much regard to resistance. This coil 24 may thus be a thin wire of many turns. Its inherent resistance is thus increased and in consequence a smaller resistor 23 may be used with my scheme for the same time constant. For one actual application on a relay of a given size, namely, for a certain desired time constant, desirable resistance values for coil 24 and resistor 23 were found to be 10,000 ohms and 3,000 ohms, respectively.

With my arrangement when switches 5 and 11 are closed, the capacitor 13 is rapidly charged through the current limiting resistor 12 and the relay 8 picks up rapidly to close the relay contact members 14. When switches 5 and 11 are opened, say, by the overload protective device 6, the capacitor slowly discharges through the high resistance value resistor 23 and high resistance value coil 24 and after a definite time, $t_3$, contact members 14 open.

It will be noted from curve B that $t_3$ is larger than $t_2$ even though a smaller capacitor is used. The position of the points $a$ and $b$ above $o$ are a measure of the size of the capacitor. If $b$ represents a capacitor size commercially warranted and this size is used with the prior art scheme then the best time that can be obtained with the prior art scheme is $t_1$ on curve C.

With my timing circuit I thus obtain a "snappy" pick-up, a more certain and reliable pick-up, more hold-in ampere turns and above all a longer time constant. Further, I may also use a smaller and cheaper capacitor 13 and smaller and cheaper resistor 23. Whether or not these last two advantages are obtained depends on the time constant desired. The longest time constant possible is the usual aim and this aim I attain to a much higher degree than obtained by similar prior art devices and I also attain the advantage of a rapid and reliable relay pick-up, not attainable with similar prior art devices adjusted for maximum time constants.

I have, with a given relay having a normal timing period of about five seconds, obtained a time delay of more than a minute.

In addition to the advantages already pointed out, I obtain another advantage in the use of the two coils. These coils 7 and 24 during discharge of the capacitor act cumulatively to thus increase the time delaying holding force as a function of the combined turns of the coils. The turns and resistance of coil 7 are so chosen as to obtain rapid pick-up, whereas coil 24 is designed, without regard to resistance, for as many turns as can be put in the available space.

The only limitation for coil 24 is the practical consideration of the wire sizes that can be satisfactorily wound commercially. The characteristics to be obtained to some extent determine the relative design of the two coils.

To fully understand my invention in combination with actual control systems, brief studies of operating sequences may not be amiss.

If buses 1 and 10 are energized and then switch 3 is closed, a circuit is established from bus 1, through switch 3, conductor 4, switch 5 of overload protective device 6, coil 7 of the relay 8, and conductor 9 to bus 10. A circuit is also established from conductor 4 through switch 11, current limiting resistor 12, capacitor 13 to conductor 9. Relay 8 thus rapidly closes contact members 14 and the capacitor 13 is quite rapidly charged—the initial charging current being held to desired low value by the resistor 12 which for a given capacitor was 50 ohms.

When the motor M is to be started switch 18 is closed. This operation establishes a circuit from bus 1 through switch 3, contact members 14, stop switch 15, coil 16 of the line contactor 17 to bus 10. Line contactor 17 holds itself in through switch 19 and the motor M is, through switches 20 and 21, connected to operate.

In the event of an overload, coil 22 is sufficiently energized to open switches 5 and 11 and after a predetermined time, should the overload persist long enough, contact members 14 open to effect the deenergization of the motor.

Figure 2:
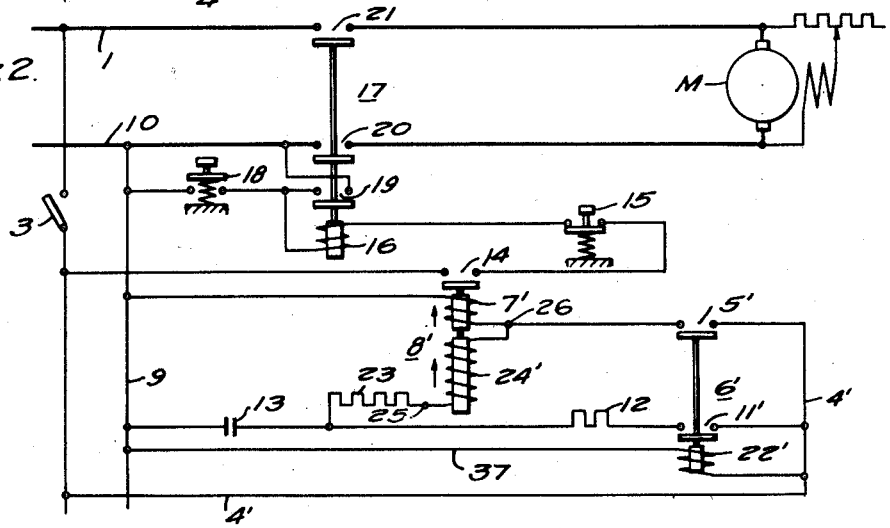
Fig. 2 is a diagrammatic showing of my invention in combination with a low-voltage protective motor control.

In Fig. 2 like parts have been designated by like reference characters. The relay 8' is, however, controlled from a low-voltage protective device 6' having its coil 22' connected, as shown, to the supply. In the event of a low voltage of sufficient duration, the opening of contact members 14 is effected and the motor is disconnected from the supply.

In the modification shown in Fig. 2, I show coils 7' and 24' provided with the same size wire. The wire size for the coils is so selected that coil 7' still gives a "snappy" pick-up. The number of turns chosen for coil 7' is considerably smaller than that for coil 24'. When switches 5' and 11' open the capacitor 13 discharges through both coils 7' and 24' acting cumulatively. This combined action of the coils is another important advantage I obtain. During discharge of the capacitor, the total number of ampere turns is thus determined by the discharge current times the sum turns of coils 7' and 24'.

While I have disclosed my invention in considerable detail, I do not wish to be limited to the specific showings made but wish to be limited only by the scope of the claims hereto appended.

I claim as my invention:

1. In a system of control, in combination, a load circuit, a source of direct current power comprising a pair of energized terminal conductors, a normally closed double pole switch operable to open in response to an operating characteristic of the load circuit, a current limiting resistor and a capacitor connected in series with each other connected to said terminal conductors through one pole of said switch, a relay having make contact members and two actuating coils, one of said coils of few and relatively heavy turns being connected to said terminal conductors through the other pole of said switch, the second coil having many relatively fine high resistance turns, a high resistance resistor and said second coil being connected in series circuit, one terminal of this last-named series circuit being connected between the capacitor and the current limiting resistor and the other terminal of this last-named series circuit being connected between the first-named coil and the said other pole of said switch.

2. In a time limit device, in combination, a source of direct current comprising a pair of energized terminal conductors; a series circuit including, a coil of relatively few and heavy turns, a capacitor, a resistor of relatively high resistance value, and a second coil of relatively many fine turns; a load circuit; a current limiting resistor of relatively low resistance value; switching means for connecting the current limiting resistor and capacitor, which are connected in series, to said pair of conductors; switching means for connecting the first-named coil to said pair of conductors; and means responsive to an electric characteristic of the load circuit for effecting the substantially simultaneous opening of both said switching means, whereby the capacitor discharges relatively slowly through said two coils and the first-named resistor to maintain said two coils, which are wound so as to act cumulatively, energized for a given time period; and means actuated by the two energized coils to effect deenergization of said load circuit.

3. In a time limit device, in combination, a source of direct current comprising a pair of energized terminal conductors; a series circuit including, a coil of relatively few conductor turns and wherein the conductor weight per unit length may fall within the range of a given light weight to a given greater weight, a capacitor, a resistor the resistance value of which may fall within a relatively wide range, and a second coil of many more conductor turns than the first coil and wherein the conductor weight per unit length may fall within the range of said given light weight to a given lesser weight; a load circuit, a current limiting resistor of a relatively low resistance value; switching means for connecting the current limiting resistor and capacitor, connected in series, to the terminal conductors; switching means for connecting the first-named coil to the terminal conductors; means responsive to an electrical characteristic of the load circuit for simultaneously opening said two switching means whereby the two coils are energized for a given time by the discharge current of the capacitor; and means operable when the coils are no longer sufficiently energized for altering the circuit connection of said load circuit.

4. In a time limit device, in combination, a source of direct current comprising a pair of energized terminals; a series circuit, said series circuit including, a coil having a given resistance value and having a given number of turns, a capacitor, a resistor, and a second coil having a resistance value higher than the given resistance value of the first coil and having more turns than the number of turns of the first coil; a current limiting resistor; switching means which upon closing establish an energizing circuit from the junction of the first-mentioned coil and capacitor to one terminal of the source of direct current and separately from the junction of the mentioned coils, and the junction of the capacitor and the first named resistor through the current limiting resistor to the other terminal of the source of direct current whereby closure of said switching means causes relatively rapid charging of the capacitor and relatively rapid energization of said first-mentioned coil and whereby subsequent opening of said switching means causes a slow discharge of said capacitor through said series circuit.

5. In a time limit device, in combination, a source of direct current; a series circuit, said series circuit including, a coil having a given resistance value, one terminal of the source of direct current, a capacitor, a resistor, and a second coil having a resistance value higher than the given resistance value of the first coil; switching means for connecting the other terminal of the source of direct current to the junction between the capacitor and resistor and also to the junction between the two coils, whereby closure of said switching means causes relatively rapid charging of the capacitor and relatively rapid energization of said first-mentioned coil and whereby subsequent opening of said switching means causes a slow discharge of said capacitor through said series circuit.

6. In a time limit device, the combination of, a source of direct current comprising two current conductors, a switch, a resistor, and a capacitor connected in series across the two conductors, a magnetic coil and switch connected in series across the two conductors, a high resistance resistor and a magnetic coil of many more turns and higher resistance value than the resistance value of said first-named coil connected in a series circuit and having one end of this series circuit connected to the junction between the capacitor and the first-named resistor and having the other end of the circuit connected between the first-named coil and second-named switch, and means for opening the two switches simultaneously, whereby the condenser discharges through the two coils to maintain them energized for a given time, an armature for said coils operated rapidly to one position by the first-named coil and maintained in said operated position for said given time by the cumulative action of the coils upon opening of said switches.

7. In a time limit device, the combination of, a source of direct current comprising two current conductors, a resistor, a switch, and a capacitor connected in series across the two conductors, a magnetic coil and switch connected in series across the two conductors, a high resistance resistor and a magnetic coil of many more turns and higher resistance than said first-named coil connected in a series circuit and having one end of the circuit connected between the capacitor and the first-named resistor and having the other end of the circuit connected between the first-named coil and second-named switch, and means for opening the two switches simultaneously, whereby the condenser discharges through the two coils to maintain them energized for a given time.

8. In a time limit device, in combination, a source of direct current comprising a pair of energized terminals; a series circuit including, a coil, one terminal of said source of direct current, a capacitor, a resistor, and a second coil; switching means for connecting the other terminal of the source of direct current to the junction of the capacitor and resistor and also to the junction between the two coils, an armature biased to one position and operable to a second position by the energization of said first-mentioned coil, and a switch operated by the movement of the armature, said two coils upon interruption of the connections established by said switching means acting cumulatively by the discharge current of the capacitor to hold said armature in said second position for a given time period after the opening of said switching means.

9. In a time limit device, in combination, a source of direct current comprising a positive terminal and a negative terminal; a series circuit, said series circuit including, a coil having a given resistance value and having a given number of turns, a capacitor, a resistor, and a second coil having a resistance value higher than the given resistance value of the first coil and having more turns than the number of turns of the first coil; and switching means which upon closing establish an energizing circuit from the junction between the first coil and the capacitor to one terminal of the source of direct current and from the junctions between the coils and the capacitor and resistor respectively to the other terminal of the source of direct current, whereby relatively rapid charging of the capacitor is obtained and relatively rapid energization of said first-mentioned coil is obtained and whereby subsequent opening of said switching means causes a slow discharge of said capacitor through said series circuit.

AMOS J. WINCHESTER, Jr.